United States Patent
Saxena et al.

(10) Patent No.: US 8,306,932 B2
(45) Date of Patent: Nov. 6, 2012

(54) SYSTEM AND METHOD FOR ADAPTIVE DATA MASKING

(75) Inventors: Ashutosh Saxena, Ahmedabad (IN); Vishal Anjaiah Gujjary, Hyderabad (IN); Kumar Surni, Chennai (IN)

(73) Assignee: Infosys Technologies Limited (IN)

( * ) Notice: Subject to any disclaimer, the term of this patent is extended or adjusted under 35 U.S.C. 154(b) by 741 days.

(21) Appl. No.: 12/384,776

(22) Filed: Apr. 8, 2009

(65) Prior Publication Data

US 2009/0281974 A1 Nov. 12, 2009

(30) Foreign Application Priority Data

Apr. 8, 2008 (IN) .............................. 882/CHE/2008

(51) Int. Cl.
*G06F 15/18* (2006.01)
*G06N 3/00* (2006.01)
(52) U.S. Cl. ........................................................ 706/42
(58) Field of Classification Search .................. None
See application file for complete search history.

(56) References Cited

OTHER PUBLICATIONS

'Dynamic masking of application displays using OCR technologies': Porat, 2009, IBM J. Res & Dev. vol. 53, No. 6 paper 10.*
'Selective data masking design in intelligent knowledge capsule for efficient data mining': Shim, 2005, Springer-Verlag, AI 2005, LNAI 3809.*
'A neural network approach for data masking': Gujjary, 2011, Neurocomputing, vol. 74, Issue 9, pp. 1497-1501.*
'An introduction to neural networks': Gurney, 1997, CRC press, ISBN 1-85728-673-1 & 1-85728-503-4.*

* cited by examiner

*Primary Examiner* — Omar Fernandez Rivas
*Assistant Examiner* — Peter Coughlan
(74) *Attorney, Agent, or Firm* — Lerner, David, Littenberg, Krumholz & Mentlik, LLP (57) ABSTRACT

A method for adaptive data masking of a database is provided. The method comprises extracting data from a first database and providing one or more predefined rules for masking the extracted data. The method further comprises masking a first portion of extracted data using a trained Artificial Neural Network (ANN), where the ANN is trained for masking at least one database having properties similar to the first database. The masked and unmasked data is aggregated to arrive at an output structurally similar to the extracted data. The method furthermore comprises determining a deviation value between the arrived output and expected output of the extracted data, and adapting the trained ANN automatically according to data masking requirements of the first database, if the deviation value is more than a predefined value.

17 Claims, 6 Drawing Sheets

SYSTEM AND METHOD FOR ADAPTIVE DATA MASKING

FIELD OF THE INVENTION

The present invention relates generally towards protection of sensitive data from unauthorized access and more specifically to a system and method for providing an adaptive data masking using neural networks.

BACKGROUND OF THE INVENTION

With the advent of online data centric activities and growth in electronic business transactions, organizations are facing constant pressure to maintain a growing volume of sensitive and non-sensitive data. The ease at which data can be collected automatically, stored in databases, and queried efficiently over the internet (or otherwise) has paradoxically worsened the privacy situation and has raised numerous ethical and legal concerns, such as, private data falling into malicious hands, theft, stalking on the web, spam, etc.

Numerous 'data privacy' research indicates that more than half of security breaches comes from within the organization and are fifty times costly when compared with external breach. A worldwide awareness and concern towards data privacy legislation has put pressure on organizations to improve their data privacy and security standards. Thus, there is a need to provide technological solutions to achieve privacy keeping a tradeoff between data privacy and data utility. Several techniques including data masking is employed to achieve data privacy and data usability. Data masking can be defined as a process whereby the information in a database is masked or 'de-identified'.

Data masking is a process of masking pre-determined data within a database to ensure data security of private and confidential data. Data masking is usually carried out to avoid dissemination of sensitive information to non-authorized persons. It enables the creation of realistic data in non-production environments without the risk of exposing sensitive information to unauthorized users. Data masking ensures protection of sensitive information from a multitude of threats posed both outside and inside the organization's boundary. Several techniques have been used for data masking, like, anonymization, randomization, perturbation, cryptographic approach, Privacy Policy Languages and Data Masking.

While data masking is one of the known method of protecting data, there is still a need to have a data masker which can mask the data in such a fashion, that the masked data acts like real data for all practical purposes. Further, data maskers are also not able to maintain the data relationships between rows, columns, and various tables and once the masking is over, relationships within the databases are lost. Furthermore, the efficiency of existing data maskers to reproduce data once the data has been masked is abysmally low. Moreover, the existing data maskers are not able to fit in with the existing legacy databases resulting in compatibility issues. In addition, the ease of use and intelligent masking of data is a constant concern with the conventional data maskers. Also, the conventional data maskers employ encryption or substitution or shuffling or data-number variance or other techniques which either lack in look-and-feel of real data or are slower in speed or erroneous in data masking or are dependent on type of database and language.

In light of the abovementioned disadvantages, there is need for a data masker which can provide similar look-and-feel to masked data as of real data. Further, there is need to provide data masking at much faster rate with minimum error. In addition, there is a need for a data masker which is independent of the type of database and languages.

BRIEF SUMMARY OF THE INVENTION

A method for adaptive data masking of data present in a first database is provided. The method comprises firstly extracting data from the first database and providing one or more predefined rules for masking the extracted data. Secondly, segregating a first portion of extracted data required for masking from a second portion of extracted data which is not required for masking. Thirdly, masking the first portion of extracted data using a trained ANN, wherein the ANN is trained for masking at least one database having properties similar to the first database. Next, aggregating the masked data and the second portion of extracted data to arrive at an output structurally similar to the extracted data. Then, determining a deviation value between the arrived output and expected output of the extracted data, the expected output being an output obtained when the trained ANN incorporates all data masking requirements of the first database. Finally, adapting the trained ANN automatically according to data masking requirements of the first database, if the deviation value is more than a predefined value.

In an embodiment of the present invention, the trained ANN masks the first portion of extracted data based on a weight matrix, the weight matrix being predetermined based on the one or more predefined rules.

In an embodiment of the present invention, the method further comprises storing the arrived output in an intermediate database.

In an embodiment of the present invention, the method further comprises labeling the intermediate database as a final mask database when the deviation between the arrived output and expected output is less than or equal to a predefined value.

In an embodiment of the present invention, the trained ANN is considered to be completely adaptive for the first database when the deviation value between the arrived output and expected output is less than or equal to a predefined value.

In an embodiment of the present invention, the trained ANN is adapted by updating a weight matrix based on the deviation value between the arrived output and expected output. In another embodiment of the present invention, the weight matrix of the adaptive ANN is updated using one or more training algorithms for neural networks.

In an embodiment of the present invention, the extracted data may be a datasheet comprising 'm' rows and 'n' columns or any combination of the datasheet, thereof.

In an embodiment of the present invention, the one or more predefined rules are represented as metadata, the metadata being a sparse way of representing the extracted data.

A system for adaptive data masking is provided. The system comprises a first database and a data extractor configured to extract data from the first database. The system further comprises an adaptive Artificial Neural Network (ANN) configured to mask a first portion of the extracted data based on one or more predefined rules, and automatically update itself based on data masking requirements of the first database, if a deviation value between an arrived output and expected output of the extracted data is more than a predefined value. The system furthermore comprises an aggregator configured to aggregate the masked data and a second portion of the extracted data to arrive at an output data, an intermediate database to store the arrived output data, and a quality checker to determine the deviation value between the arrived output and expected output of the extracted data.

In an embodiment of the present invention, the system further comprises a data segregator to segregate a first portion of extracted data required for masking from a second portion of extracted data, not required for masking.

In an embodiment of the present invention, the adaptive ANN is further configured to be trained for masking at least one database having properties similar to the first database.

In an embodiment of the present invention, the intermediate database is labeled as a final mask database, if a deviation value between the arrived output and expected output data is less than or equal to a predefined value.

In an embodiment of the present invention, the quality checker is further configured to store one or more predefined rules.

BRIEF DESCRIPTION OF THE DRAWINGS

The present invention is described by way of embodiments illustrated in the accompanying drawings wherein.

DETAILED DESCRIPTION

A system and method for adaptive data masking of data present in a database are described herein. The invention provides a means for providing one or more rules for masking a first portion of a first database using a trained Artificial Neural Network (ANN). The invention further provides a means for aggregating the masked and unmasked data of the input database to arrive at an output structurally similar to input data. The invention furthermore provides a means for adapting the trained ANN automatically according to data masking requirements of the first database. The method of the present invention may be provided on a computer readable medium.

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Figure 1:
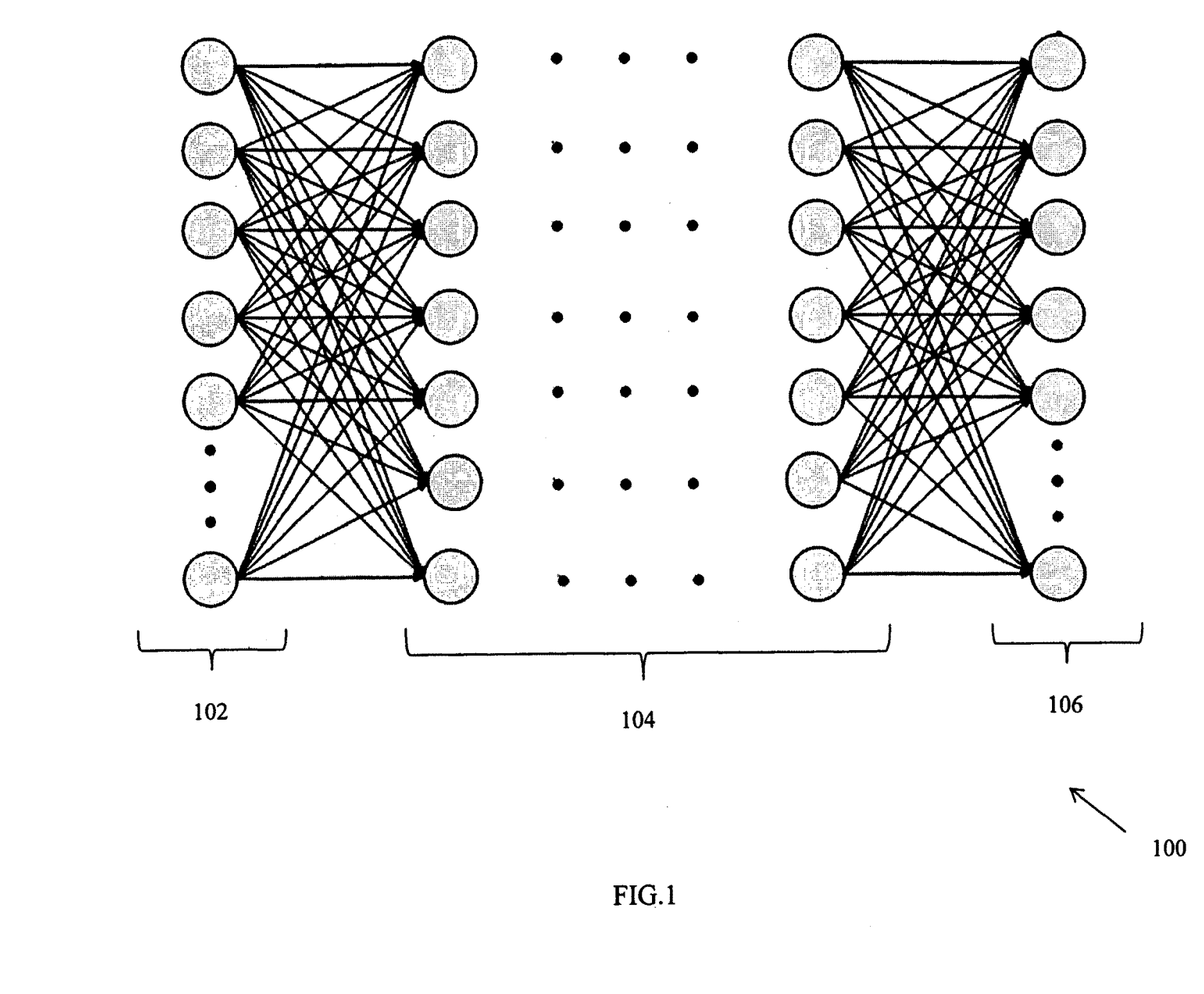
FIG. 1 is a block diagram illustrating an Artificial Neural Network (ANN) used in accordance with the present invention.

FIG. 1 is a block diagram illustrating an Artificial Neural Network (ANN) 100 used in accordance with the present invention. ANN 100 is a three layered network structure which facilitates modeling of complex relationships among one or more input and output nodes to perform predefined tasks. In an embodiment of the present invention, the ANN 100 comprises the input nodes 102 as its first layer, the hidden nodes 104 as its second layer, and the output nodes 106 as its third layer. The input nodes 102, hidden nodes 104, and output nodes 106 are network processing elements which are connected to each other. In another embodiment of the present invention, each connection in the ANN 100 has pre-defined weight and pre-defined weights of all connections of the ANN 100 may be represented in form of a weight matrix.

In an embodiment of the present invention, the input nodes 102 represent raw data which is fed to the ANN 100. The input nodes 102 are connected to the hidden nodes 104, which are further connected to the output nodes 106. The output nodes 106 represent output information of the ANN 100. In various embodiments of the present invention, input nodes 102 transfer their information to the output nodes 106 through the hidden nodes 104. In another embodiment of the present invention, input nodes 102, hidden nodes 104, and output nodes 106 use similar transfer function to propagate information in the ANN 100.

Figure 2:
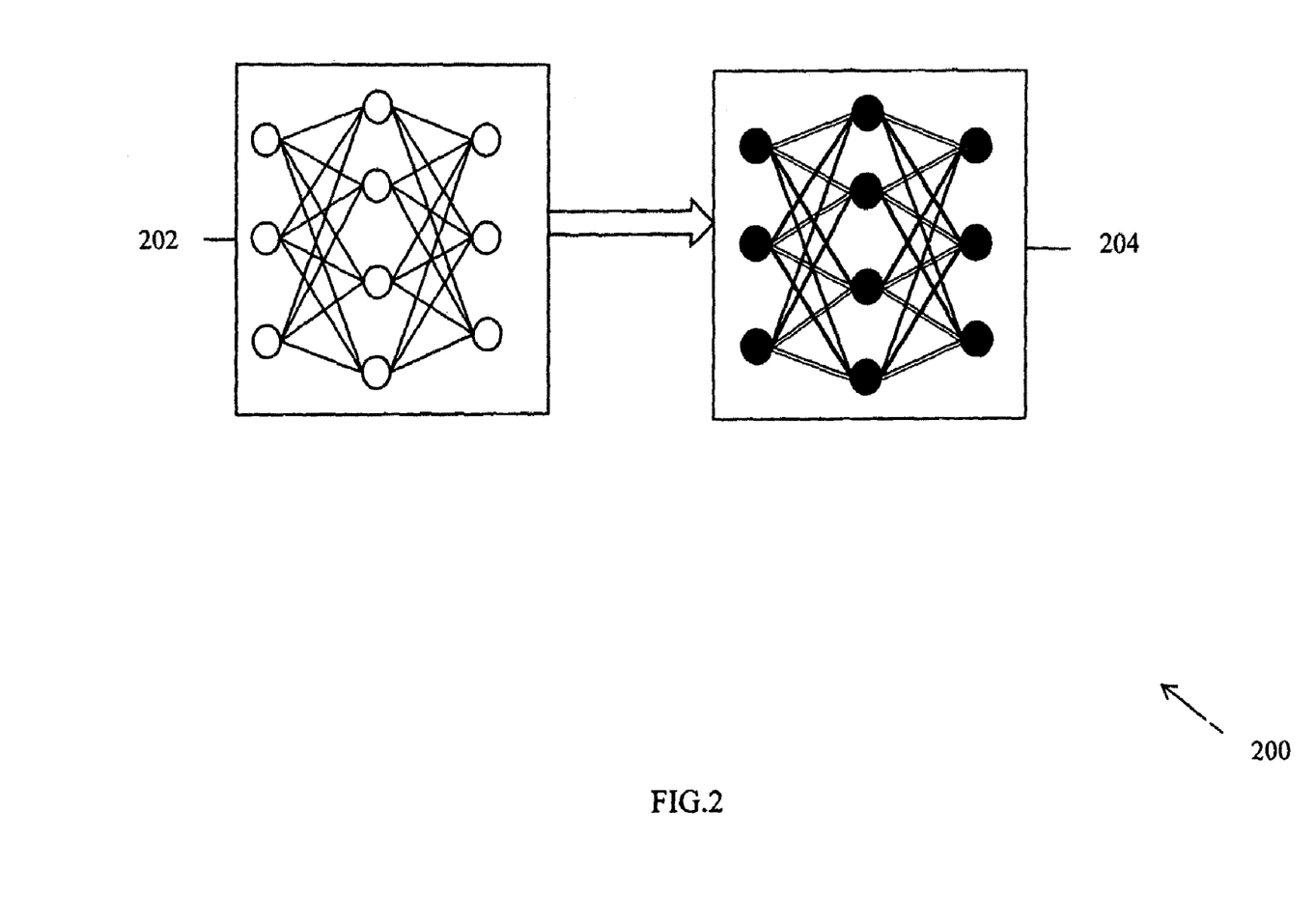
FIG. 2 is a block diagram illustrating transformation of a nascent ANN to an adaptive ANN.

FIG. 2 is a block diagram illustrating transformation of a nascent ANN 202 to an adaptive ANN 204. The nascent ANN 202 is an untrained ANN, whose weights are initialized either to zero or a random number. In an embodiment of the present invention, the nascent ANN 202 may be trained to facilitate data masking of one or more databases. In another embodiment of the present invention, the process of training the nascent ANN 202 for data masking comprises creating a network topology and then setting the weights of each connection according to one or more pre-determined rules of data masking. In yet another embodiment of the present invention, when the nascent ANN 202 is completely trained, it may form an adaptive ANN 204. The adaptive ANN 204 facilitates masking of data present in one or more databases. In an embodiment of the present invention, the adaptive ANN 204 automatically updates and adapts itself according to data masking requirements of one or more input databases.

Figure 3:
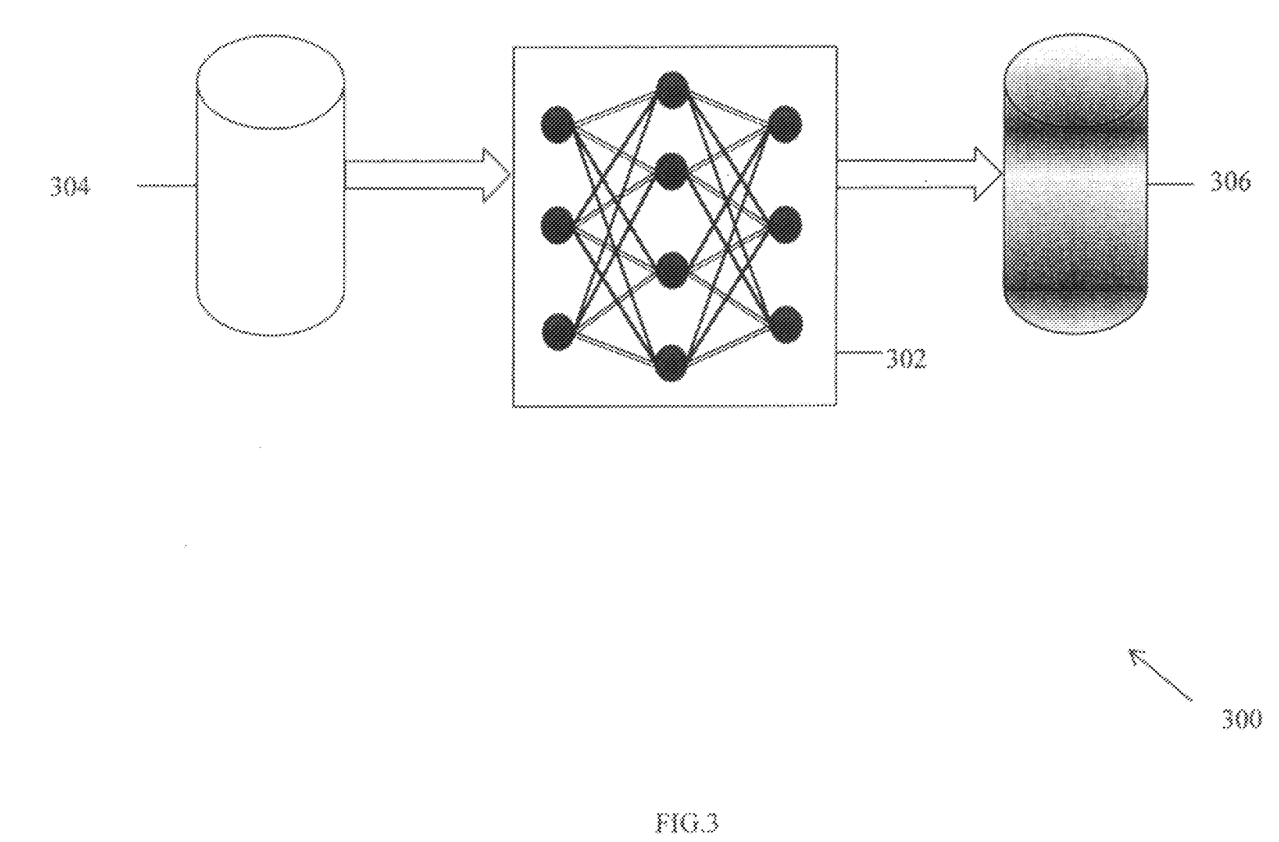
FIG. 3 is a logical arrangement illustrating data masking of an input database using an adaptive ANN.

FIG. 3 is a logical arrangement 300 illustrating data masking of an input database 302. The logical arrangement 300 comprises an input database 302, an adaptive ANN 304, and an output database 306. The input database 302 includes data that needs to be masked by the adaptive ANN 304. In an embodiment of the present invention, the adaptive ANN 304 masks data that is received from the input database 302 based on a set of predefined rules. In an embodiment of the present invention, the predefined rules may be set by an authorized person within an organization. The output database 306 receives the desired masked data from the adaptive ANN 304. In an embodiment of the present invention, the masked data outputted from the adaptive ANN 304 is stored in the output database 306 for future restricted use.

Figure 4:
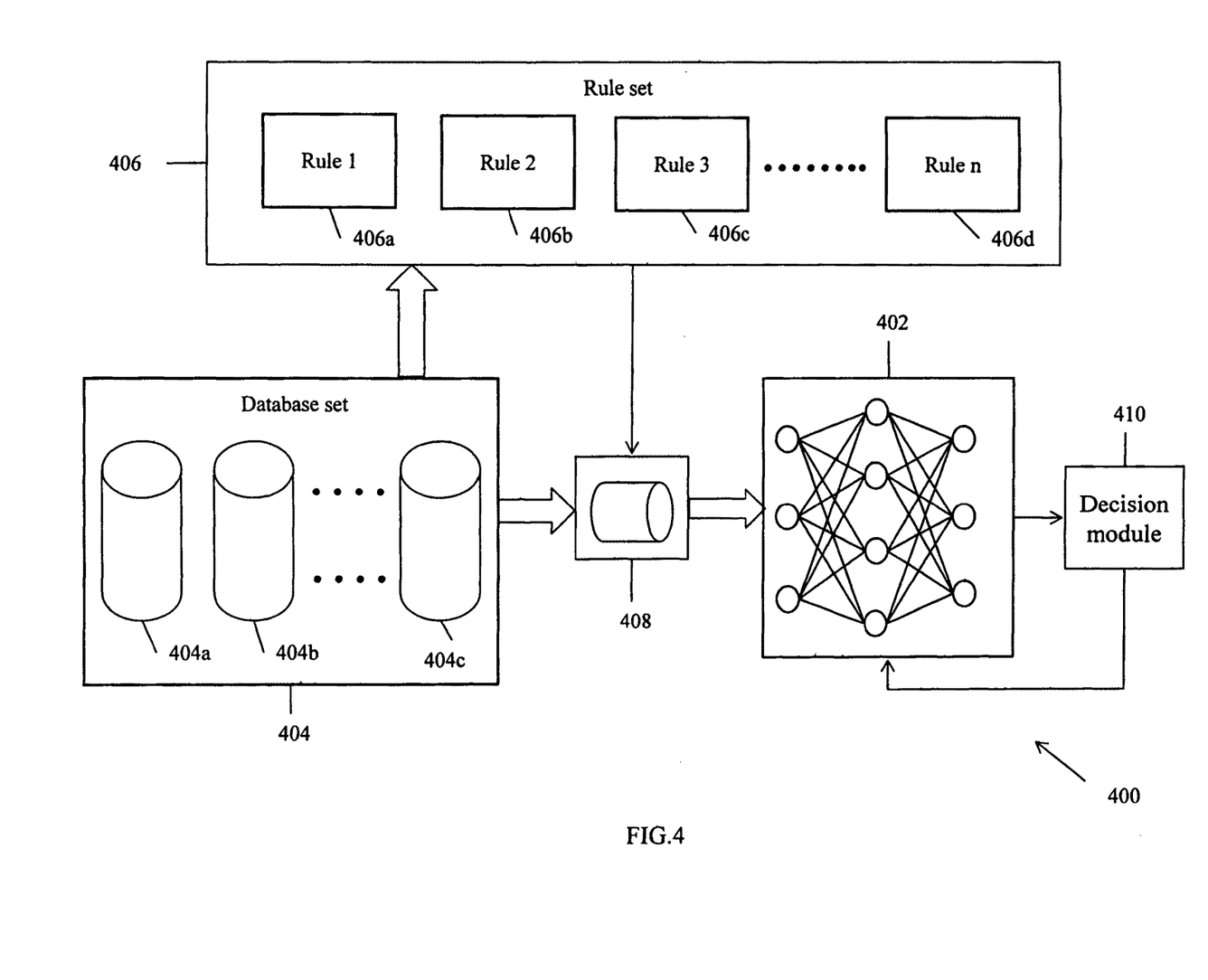
FIG. 4 is a block diagram illustrating software and hardware components that facilitates training of an ANN.

FIG. 4 is a block diagram illustrating software and hardware components 400 that facilitates training of an ANN 402. The software and hardware components 400 comprise a database set 404, a rule set 406, a data extractor 408, and a decision module 410.

The ANN 402 is an untrained neural network that may be trained for masking training data. In an embodiment of the present invention, the training data may be a portion of data selected from the database set 404. In another embodiment of the present invention, the training data may be a type of data which a completely trained ANN 402 may receive in future data masking requests. In yet another embodiment of the present invention, the process of training the ANN 402 is one time activity and once the ANN 402 is trained, it captures all the properties of the training data.

The database set 404 comprises databases 404a, 404b, and 404c, each having different properties and including different data types. In an embodiment of the present invention, the database set 404 may be referred to as training data and facilitates the ANN 402 to be trained for masking various types of data.

In various embodiments of the present invention, the ANN 402 may be trained for masking the training data based on one or more predefined rules of the rule set 406. The rule set 406 comprises rules 406a, 406b, 406c, and 406d which may be set by an authorized user for specifying his data masking requirements. In an embodiment of the present invention, the rule set 406 may be used to define neural network parameters for training the ANN 402. In another embodiment of the present invention, the authorized user may select one or more rules from the rule set 406 for masking the training data. Based on one or more selected rules, the rule set 406 may form a metadata from the database set 404, where the metadata is a sparse way of representing the training data.

The data extractor 408 facilitates extraction of metadata from the rule set 406. Based on the metadata, the data extractor 408 may extract the training data from the database set 404. The data extractor 408 then feeds the training data to the ANN 402 in the form of an input vector. Based on its weights at that instant, the ANN 402 generates an output vector corresponding to the input vector. In an embodiment of the present invention, the output vector comprises data obtained by masking the training data.

The decision module 410 facilitates verification of the output vector generated by the ANN 402. In an embodiment of the present invention, the decision module 410 verifies whether the ANN 402 has masked the training data according to data masking requirements of the authorized user. The ANN 402 receives the output vector from the ANN 402 and compares it with expected output of the training data. The decision module 410 then determines the deviation value between the output vector and the expected output. If there is a deviation in the output vector and expected output, the decision module 410 may redirect the deviation value to the ANN 402. Based on the deviation value, the ANN 402 may update its weight matrix to produce a better approximation of the expected output. If the difference between the output vector and the expected output is negligible, it may be considered that the ANN 402 has learnt the data masking rules of the training data. The ANN 402 is then considered to be completely trained for masking the training data. In various embodiments of the present invention, the completely trained ANN 402 may be ready for masking data which have properties similar to the training data.

In an exemplary embodiment of the present invention, for a database 404a, where the database 404a comprises a first table containing 'n' number of rows and 'm' number of columns, a rule 406a for masking the first table may be designed as follows:

Rule: F(X->a,Y->b) implies that the entity X->a is replaced with the output of Y->b based on function 'F', where:
Rx—xth Row of the first table
Ry—yth Row of the first table
Fa—ath Field of the first table
Fb—bth Field of the first table
Rule 1: Shuffle (Rx->Fa, Ry->Fb)
Rule 2: Substitution (Rx->Fa, a regular expression)
Rule 3: Encryption (Rx->Fa, an encryption algorithm)
Rule 4: Masking (Rx->Fa, usage of abstract symbols like '*', '#','@','$' to hide data)
Rule 5: Number Variance (Rx->Fa, output of random function within limits)

In various exemplary embodiments of the present invention, the data masking rules for training the ANN 402 may be formulated based on association between different indices of a datasheet, where each index corresponds to a row in the datasheet. The datasheet may be, for example, may be referred to as "EMPLOYEE". In the datasheet "EMPLOYEE", there may be several columns such as EMPLOYEE_ID, EMPLOYEE_NAME, EMPLOYEE_AGE, EMPLOYEE_GENDER, and EMPLOYEE_LOCATION etc. Hence association could be made among the different employee IDs using the indices corresponding to them. Similarly association could be made among the first names, middle names, different last names and different ages of the different employee IDs.

In various exemplary embodiments of the present invention, following rules may be framed for masking data present in the datasheet "EMPLOYEE".

Rule: Shuffle (Row 1->First name, Row 10->First name)
Rule: Shuffle (Row2->First name, Row 12->Middle name)
Rule: Shuffle (Row3->Last name, Row15->Last name)
Rule: Shuffle (Row4->Middle name, Row 12->First name)
Rule: Shuffle (Row12->Middle name, Row17->Last name)
Rule: Shuffle (Row 1->(First name, Middle name, Last name), (Row12->First name, Row16->Middle name, Row18->Last name))//Relevance between the first, middle and last names has to be maintained.
Rule: Shuffle (Row14->(First name, Middle name, Last name), Row 18->(First name, Middle name, Last name))//Relevance between the first, middle and last names has to be maintained.
Rule: Substitution (Row->Employee mobile no, Retain the first digit as 9 and replace the other digits by some random numbers)//The total digits must be 10.
Rule: Shuffle (Row1->House No., Row10->House No.)
Rule: Shuffle (Row3->Address Line 1, Row11>Address Line 2)
Rule: Shuffle (Row4->Address Line 2, Row12>Address Line 1)
Rule: Shuffle (Row7->(Address Line 1, Address Line 2),Row14->(Address Line 1, Address Line 2))
Rule: Shuffle (Row1->(City, Pin code), Row12->(City, Pin code))
Rule: Masking (Row->Account Number, Mask the digits with * or $ or # so that the digits and the order is not revealed)
Rule: Encryption (Row->PIN number, with some key)
Rule: Shuffle (Row1->E-Mail-ID, Row13->E-Mail-Domain)
Rule: Shuffle (Row3->E-Mail-ID, Row14->E-Mail-Domain)
//Forms pairs such that the relevance with the name is maintained.
Rule: Shuffle (Row4->Account_Opening_Date_Year, Row16->Account_Opening_Date_Year)
Rule: Shuffle (Row6->Account_Closing_Date_Year, Row11->Account_Closing_Date_Year)
Rule: Number Variance (Row->Account_Opening_Date_Day, any random value that is realistic and between the maximum and the minimum limit)//1-28 in February, 1-29 in February Leap year etc.
Rule: Number Variance (Row->Account_Opening_Date_Month, any random value between 1 to 12)//pairs are to be formed such that the year of opening is before year of closing.
Rule: Number Variance (Row->Current Deposit, To some value that is realistic and between the maximum and the minimum limit)//For some banks there has to be minimum balance.

Rule: Masking (Row->Rating, Replace with any random number between 1 and 5).

Figure 5:
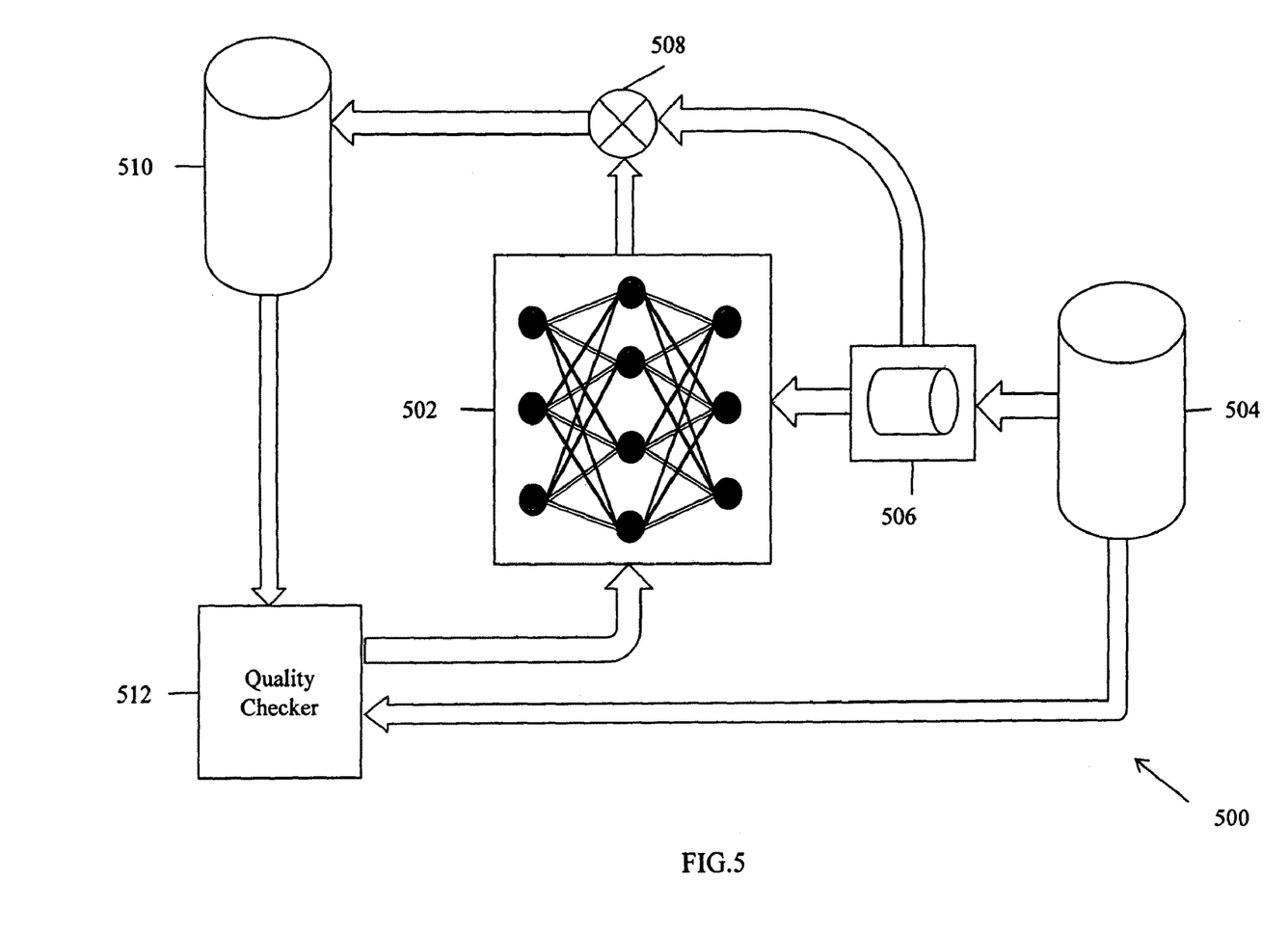
FIG. 5 is a block diagram of an Adaptive Data Masker.

FIG. 5 is a block diagram of an Adaptive Data Masker (ADM) 500. The ADM 500 comprises an adaptive ANN 502, a first database 504, a data extractor 506, an aggregator 508, an intermediate database 510, and a quality checker 512.

The ADM 500 facilitates adaptive data masking of the first database 504 based on one or more predefined data masking rules. In an embodiment of the present invention, the ADM 500 uses learning & reproducing mechanisms of the adaptive ANN 502 to capture properties of the first database 504 along with relationship between different elements of the first database 504.

The adaptive ANN 502 is an artificial neural network that facilitates generation of masked data from unmasked data of the first database 504. In an embodiment of the present invention, the adaptive ANN 502 may be trained for masking data present in the database set 404 (FIG. 4) and may not be specific to the first database 504. In another embodiment of the present invention, the first database 504 may be different from the database set 404 (FIG. 4), but may have properties similar to the database set 404. (FIG. 4). In various embodiments of the present invention, the adaptive ANN 502 may automatically update and adapt itself according to data masking requirements of the first database 504.

In an embodiment of the present invention, a user may specify data type and data properties of the first database 504 that are required to be masked. Based on the data type and properties that are required to be masked, a data segregator segregates a first portion of input data required for masking from a second portion of input data which is not required for masking. The data extractor 506 then extracts the first and second portions of input data from the first database 504. In an embodiment of the present invention, the data extractor 506 sends the first portion of input data to the adaptive ANN 502. In another embodiment of the present invention, the data extractor 506 sends the second portion of input data to the aggregator 508.

In various embodiments of the present invention, the adaptive ANN 502 converts the unmasked data fed to it into masked data based on pre-determined weights. In an embodiment of the present invention, the adaptive ANN 502 masks the first portion of the input data based on one or more predefined rules. The adaptive ANN 502 then sends the masked data to the aggregator 508.

The aggregator 508 facilitates aggregation of one or more input data streams. In an embodiment of the present invention, the aggregator 508 facilitates aggregation of unmasked data received from the data extractor 506 and masked data received from the adaptive ANN 502 to arrive at an output structurally similar to the input. In another embodiment of the present invention, the aggregator 508 sends the arrived output to the intermediate database 510 for storage. In an embodiment of the present invention, the intermediate database 510 may be labeled as a final mask database when the arrived output satisfies the data masking requirements of the first database 504.

In an exemplary embodiment of the present invention, the first database 504 may comprise a datasheet of 'n' columns and 'm' rows. The datasheet may comprise 'x' columns that needs to be masked and 'n-x' columns that need not be masked. The aggregator 508 aggregates unmasked 'x' columns and masked 'n-x' columns to arrive at a masked datasheet structurally similar to input datasheet.

Quality checker 512 facilitates checking of the output data obtained from the intermediate database 510. In an embodiment of the present invention, the quality checker 512 is assumed to have the knowledge of properties of the first database 504, which are stored in form of one or more predefined rules. The quality checker 512 conducts quality check by determining a deviation value between arrived output and expected output of the first database 504. The expected output is an output obtained when the adaptive ANN 502 incorporates all data masking requirements of the first database. If the deviation value between the arrived output and expected output is less than or equal to a predefined value, then, the intermediate database 510 may be labeled as the final mask database. In an embodiment of the present invention, the predefined value may be set by an authorized user within an organization. In various embodiments of the present invention, once a final mask database is obtained, no further data checks are required and the adaptive ANN 502 is considered to be completely trained for the first database 504.

If the deviation between the arrived output and expected output is more than the predefined value, the adaptive ANN 502 is updated by updating its weight matrix based on the deviation value. In an embodiment of the present invention, the weight matrix of the adaptive ANN 502 may be updated using one or more training algorithms for neural networks. One such training algorithm may be a back propagation algorithm, where the back-propagation is a common method of teaching artificial neural networks to perform a given task. It is a supervised learning method, which may be implemented based on knowledge of the desired output for a given input. In various embodiments of the present invention, the process of updating the weight matrix of the adaptive ANN 502 based on comparison of expected and arrived output of the first database 504, makes the ANN 502 adaptive and specific to the first database 504.

In various embodiments of the present invention, the process of data masking by the adaptive ANN 502 is independent of usage of types of dictionaries and the adaptive ANN 502 trained for masking data in one language can be used across various languages. The process of adaptive data masking is independent of usage of types of dictionaries as the database set 504 used for training the adaptive ANN 502 may comprise one or dictionary databases.

Figure 6:
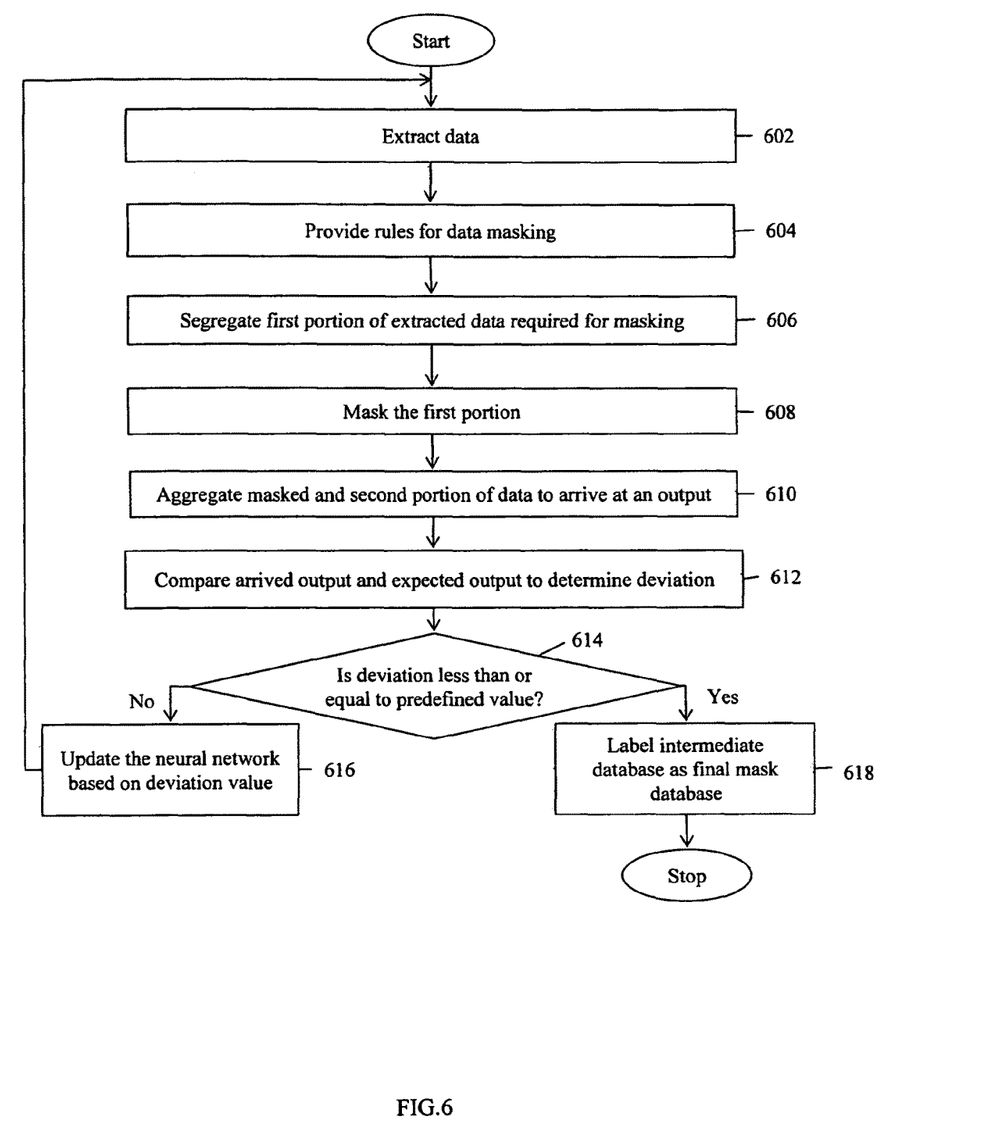
FIG. 6 is flowchart illustrating a method for adaptive data masking.

FIG. 6 is a flow chart illustrating a method of adaptive data masking of data present in a first database using an adaptive ANN. In an embodiment of the present invention, the adaptive ANN may automatically update and adapt itself according to data masking requirements of the first database.

At step 602, data which is required to be selectively masked is extracted from the first database. In an embodiment of the present invention, the extracted data may be referred to as input data and may need to be masked to hide sensitive information. In an exemplary embodiment of the present invention, the input data may be a datasheet of 'n' rows and 'm' columns. The 'x' rows of the datasheet may be required for masking, where as 'n-x' rows of the datasheet may not be required for masking.

At step 604, one or more predefined rules may be provided by an authorized user of the first database for specifying his data masking requirements. In an embodiment of the present invention, the rules may specify the data, data types, rows, columns and properties of the first database that are required to be masked.

At step 606, a first portion of extracted data required for masking is segregated from a second portion of the extracted data that is not required for masking. In an exemplary embodiment of the present invention, in a datasheet of 'n' rows and 'm' columns, 'x' rows of the datasheet which are not destined for masking may be segregated from 'n-x' rows of the datasheet which are destined for masking.

At step 608, the first portion of the extracted data is masked by the adaptive ANN. In an embodiment of the present invention, the adaptive ANN is trained for masking at least one database having properties similar to the first database. In another embodiment of the present invention, the ANN masks the first portion of the extracted data based on a weight matrix which is predetermined based on one or more predefined rules.

At step 610, the second portion of the extracted data and data masked by the adaptive ANN are aggregated to arrive at an output. In an embodiment of the present invention, the arrived output is structurally similar to the extracted data and may be stored in an intermediate database. In an exemplary embodiment of the present invention, for a datasheet of 'n' rows and 'm' columns, 'x' masked rows may be combined with 'n-x' unmasked rows to form a masked datasheet structurally similar to input datasheet.

At step 612, the arrived output and expected output of the extracted data are compared to determine a deviation between their values. In an embodiment of the present invention, the expected output is the output that may be obtained when the adaptive ANN incorporates all the data masking rules of the first database.

At step 614, a check is performed to determine if the deviation value between the arrived output and expected output is less than or equal to a predefined value. If the deviation value is more than the predefined value, then at step 616, the adaptive ANN may be updated by updating its weight matrix based on the deviation value.

If the deviation between the expected and arrived output is less than or equal to a predefined value, then at step 618, the intermediate database may be labeled as a final mask database. In an embodiment of the present invention, once the final mask database is obtained, no further data checks are required and the adaptive ANN is considered to be completely trained for the first database. The adaptive ANN may then be used for future data masking requests of the first database.

While the exemplary embodiments of the present invention are described and illustrated herein, it will be appreciated that they are merely illustrative. It will be understood by those skilled in the art that various changes in form and detail may be made therein without departing from or offending the spirit and scope of the invention as defined by the appended claims.

The invention claimed is:

1. A method for adaptive data masking of data present in a first database, the method comprising:
    extracting data from the first database;
    applying one or more predefined rules based on properties of the first database for masking the extracted data, wherein the one or more predefined rules are designed based on association between data organized in the first database, and further wherein the one or more predefined rules specify a portion of the extracted data required to be masked;
    segregating a first portion of the extracted data required for masking from a second portion of the extracted data not required for masking based on the one or more predefined rules;
    selectively masking the first portion of the extracted data using a trained Artificial Neural Network (ANN) based on the one or more predefined rules, wherein the ANN is previously trained for masking at least one database having properties similar to the first database;
    aggregating the masked data and the second portion of the extracted data to arrive at an output structurally similar to the extracted data;
    checking if the output is in accordance with the one or more predefined rules;
    modifying the output based on the one or more predefined rules, if the output is not in accordance with the one or more predefined rules; and
    adapting the trained ANN automatically according to the modified output.

2. The method of claim 1, wherein the trained ANN selectively masks the first portion of the extracted data based on a weight matrix, the weight matrix being predetermined based on the one or more predefined rules.

3. The method of claim 1 further comprising storing the arrived output in an intermediate database.

4. The method of claim 3 further comprising labeling the intermediate database as a final mask database if the output is in accordance with the one or more predefined rules.

5. The method of claim 1, wherein adapting the trained ANN automatically according to the modified output comprises using one or more training algorithms for neural networks.

6. The method of claim 1, wherein the extracted data may be a datasheet comprising 'm' rows and 'n' columns or any combination thereof.

7. The method of claim 1, wherein the one or more predefined rules are represented as metadata, the metadata being a sparse way of representing the extracted data.

8. A system for adaptive data masking, the system comprising:
    a first database;
    a data extractor configured to extract data from the first database;
    a data segregator configured to segregate a first portion of the extracted data required for masking from a second portion of the extracted data, not required for masking using one or more predefined rules designed based on properties of the first database, wherein the one or more predefined rules specify a portion of the extracted data required to be masked, and further wherein the one or more predefined rules are based on association between data organized in the first database;
    an adaptive Artificial Neural Network (ANN) configured to selectively mask the first portion of the extracted data based on the one or more predefined rules, wherein the ANN is previously trained for masking at least one database having properties similar to the first database;
    an aggregator configured to aggregate the masked data and the second portion of the extracted data, to arrive at an output data;
    an intermediate database configured to store the arrived output data; and
    a quality checker configured to:
        check if the output data is in accordance with the one or more predefined rules; and
        modify the output data based on the one or more predefined rules, if the output is not in accordance with the one or more predefined rules, wherein the trained ANN adapts itself automatically according to the modified output.

9. The system of claim 8, wherein the intermediate database is labeled as a final mask database if the output data is in accordance with the one or more predefined rules.

10. The system of claim 8, wherein the quality checker is configured to store the one or more predefined rules.

11. A computer program product comprising a non-transitory computer usable medium having a computer readable program code embodied therein for adaptive data masking of data present in a first database, the computer program product comprising:
- program instructions for extracting data from the first database;
- program instructions for applying one or more predefined rules based on properties of the first database for masking the extracted data, wherein the one or more predefined rules are designed based on association between data organized in the first database, and further wherein the one or more predefined rules specify a portion of the extracted data required to be masked;
- program instructions for segregating a first portion of the extracted data required for masking from a second portion of the extracted data, not required for masking based on the one or more predefined rules;
- program instructions for selectively masking the first portion of the extracted data using a trained Artificial Neural Network (ANN), wherein the ANN is previously trained for masking at least one database having properties similar to the first database;
- program instructions for aggregating the masked data and the second portion of the extracted data to arrive at an output structurally similar to the extracted data;
- program instructions for checking if the output is in accordance with the one or more predefined rules;
- program instructions for modifying the output based on the one or more predefined rules, if the output is not in accordance with the one or more predefined rules; and
- program instructions for adapting the trained ANN automatically according to the modified output.

12. The computer program product of claim 11, wherein the trained ANN selectively masks the first portion of the extracted data based on a weight matrix, the weight matrix being predetermined based on the one or more predefined rules.

13. The computer program product of claim 11 further comprising program instructions for storing the arrived output in an intermediate database.

14. The computer program product of claim 13 further comprising program instructions for labeling the intermediate database as a final mask database if the output is in accordance with the one or more predefined rules.

15. The computer program product of claim 11, wherein the program instructions for adapting the trained ANN automatically according to the modified output uses one or more training algorithms for neural networks.

16. The computer program product of claim 11, wherein the extracted data may be a datasheet comprising 'm' rows and 'n' columns or any combination thereof.

17. The computer program product of claim 11, wherein the one or more predefined rules are represented as metadata, the metadata being a sparse way of representing the extracted data.

* * * * *